Figure 4:
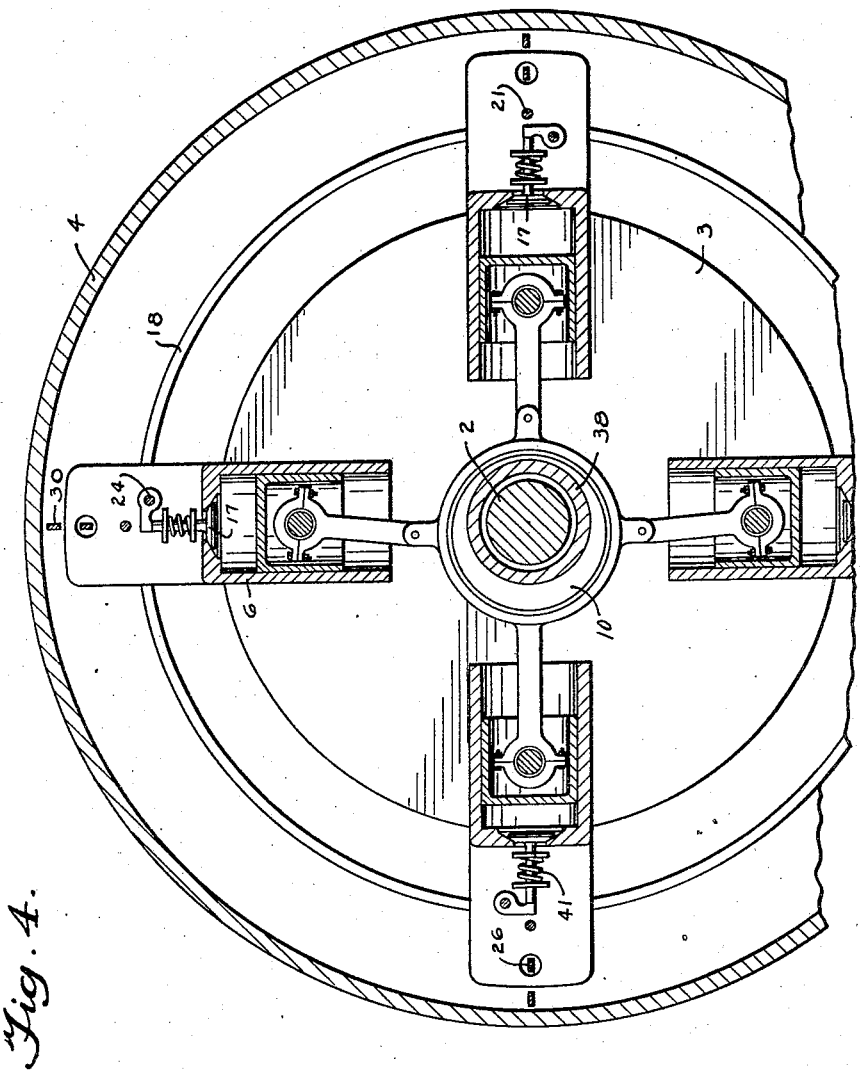

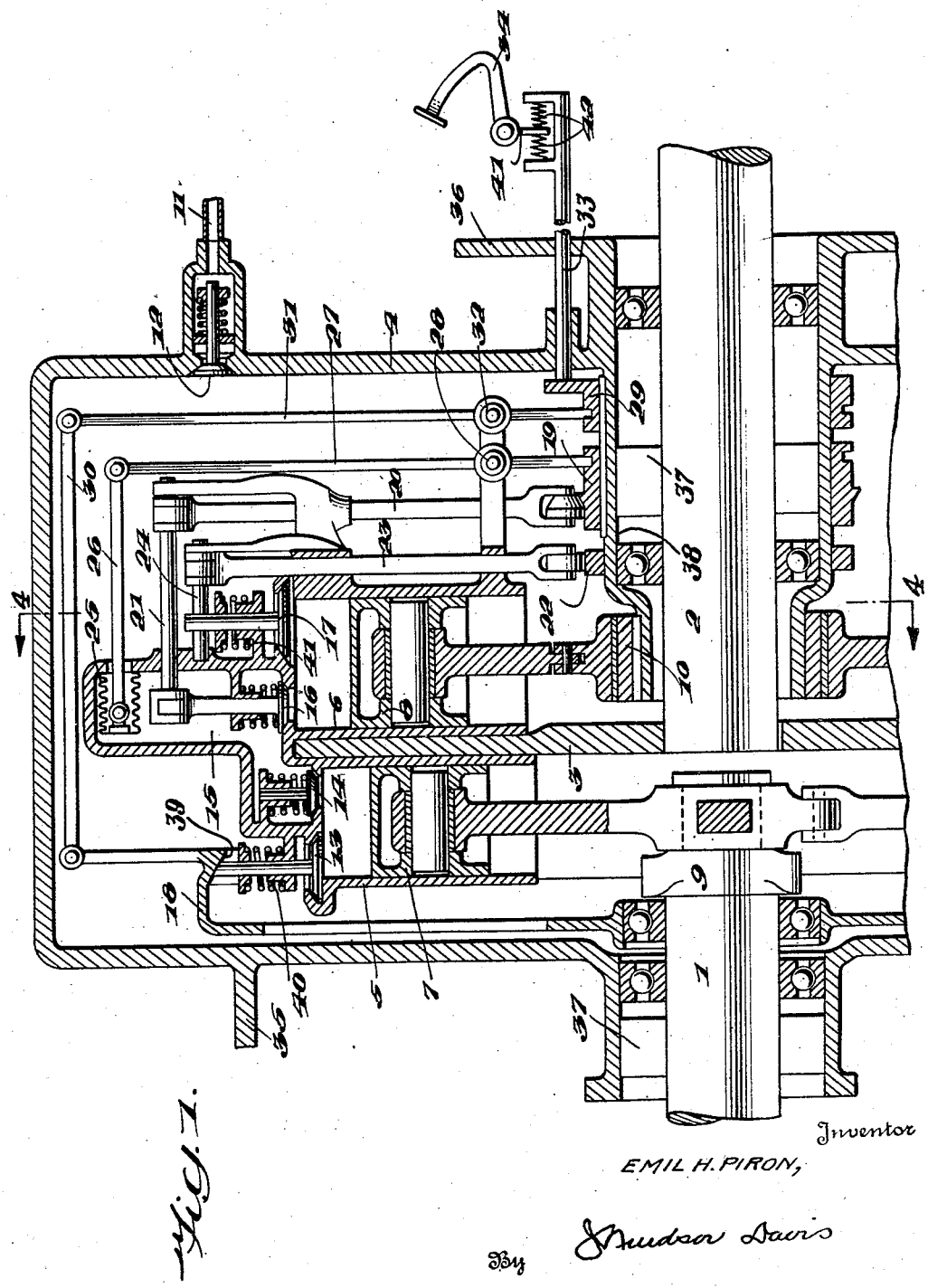

Jan. 11, 1949.  E. H. PIRON  2,458,726
PNEUMATIC VARIABLE TORQUE TRANSMISSION
Filed March 24, 1943  3 Sheets-Sheet 2
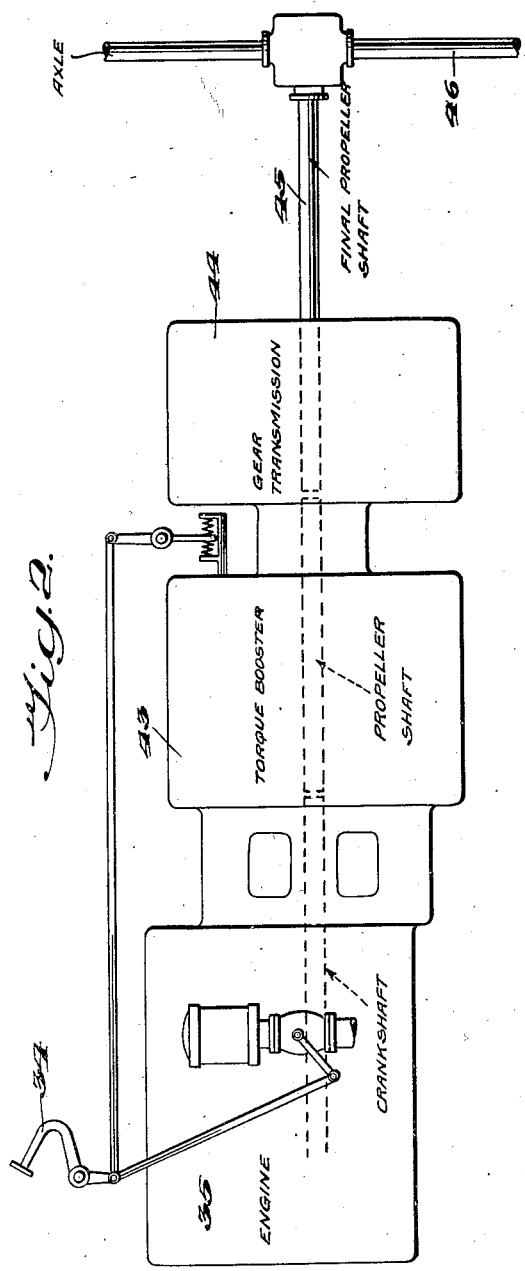
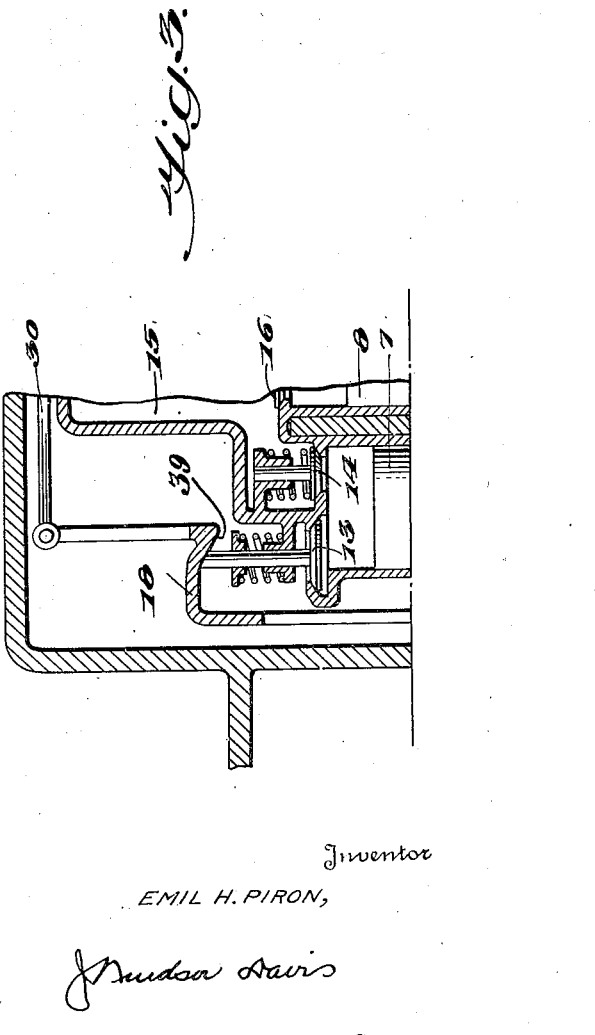
Inventor
EMIL H. PIRON,
By Hudson Davis
Attorney Jan. 11, 1949.  E. H. PIRON  2,458,726
PNEUMATIC VARIABLE TORQUE TRANSMISSION
Filed March 24, 1943  3 Sheets-Sheet 3

INVENTOR.
EMIL H. PIRON
BY

Patented Jan. 11, 1949

2,458,726

UNITED STATES PATENT OFFICE 2,458,726

PNEUMATIC VARIABLE TORQUE TRANSMISSION

Emil H. Piron, New York, N. Y., assignor to Transit Research Corporation, New York, N. Y., a corporation of New York Application March 24, 1943, Serial No. 480,409

4 Claims. (Cl. 60—62)

This invention relates to the transmission of power from a prime mover to a driven shaft and has for its object to provide a power transmission means which is effective in coupling a rotating shaft of a prime mover to a driven shaft without slippage and without undue shock, to increase or boost the prime mover torque impressed on the driven shaft during the starting period, automatically to decrease the torque with increasing driven shaft speed, and automatically to shift gear ratios between the prime mover and the driven shaft, the gear part of the transmission being at all times subject to the action of a torque booster which functions as predetermined conditions require and permit it to do so.

More particularly it is an object to provide a power transmission comprising means for increasing the torque transmitted by a prime mover to a driven shaft, this means being hereinafter referred to as a torque booster, which means is arranged to function at a maximum during the moment of initiating rotation of the driven shaft and thereafter at any time when additional torque is required. The torque produced by the torque booster decreases as the speed of the driven shaft with respect to that of the prime mover increases and the torque requirements on the driven shaft decrease until the increase in torque produced by the torque booster disappears whereupon the torque booster simply transmits the torque of the prime mover. When this condition of equilibrium occurs and when greater speed of the driven shaft is called for I contemplate that the transmission shall also comprise gears which may shift automatically in response to this condition but which will always be subject to the action of the torque booster as to the torque which they are called upon to transmit. In other words the transmission, in preferred form, is composed of a torque booster between the prime mover and shiftable gears and functions as a constant adjustment of the torque and speed of the prime mover to the torque and speed of the driven shaft.

In automotive trucks, buses, automobiles and the like, it is conventional to employ a mechanical clutch to couple the engine to the propeller shaft. To avoid shocks at the moment of starting the propeller shaft the clutch must slip. In every case, but particularly under heavy loads, as are involved in buses, great strains and great wear occur causing serious maintenance expense. In order to overcome the difficulty many buses are equipped with an electric transmission but the disadvantage of this is that the engine can race ahead of the propeller shaft thus wasting fuel and causing undue wear of many parts, and also the weight and the initial expense are far greater than that of a mechanical clutch. In other cases, a hydraulic transmission is used, particularly in automobiles, but there are serious drawbacks here also. The mechanism employed in these drives comprises a fixed vane impeller carried by the engine shaft which ejects liquid against fixed vanes carried by the propeller shaft with the result that the transmission is inefficient at all speeds except the single optimum speed for which the vanes were designed. At starting, the vanes are at minimum efficiency, great slippage and consequent racing of the engine occurs and if the slippage is sufficiently great to avoid initial starting shock the effect is similar to that of a slipping mechanical clutch. In other words if the hydraulic system is efficient at starting then a mechanical clutch is still needed, whereas if it is inefficient at starting then the engine races, undue strains are developed and the systems although their cost is less have been unable to compete with electric transmissions for bus service.

An object of this invention is to provide a torque booster between the engine or motor and the propeller shaft which will have great flexibility, which will subject the propeller shaft to the torque of the engine or motor, which will increase that torque in such manner that, as the engine develops power the propeller shaft will be caused to start its rotation but which will not permit the engine to be raced and which, as the engine is not at racing speed before the booster is subjected thereto, will cause gradual starting. There is therefore no slippage such as is found in the types of transmissions above mentioned.

More specifically it is an object to provide a torque booster comprising two sets of pistons and cylinders, one set of pistons being driven by the engine, the other set constituting the means for increasing the torque on the propeller shaft and to employ a gaseous medium such as air as the medium for driving the latter pistons by the former. It is by taking advantage of the compressibility of a gaseous fluid such as air that flexibility is developed within the torque booster and hence it is by this means that slippage is avoided. The invention in this respect may be described as a compressor the pistons of which reciprocate at the differential speed between the engine and propeller shaft and which produces compressed gaseous fluid energy as long as the speed differential is not nil, and a reciprocating motor which utilizes that energy to boost the torque to which the propeller shaft is already subjected through the compressor.

A further object is to reduce the size of the pneumatic torque booster to a minimum. I accomplish this by making two separate approaches. First, as above mentioned, I retain a gear transmission, it being found that if gears are retained capable of producing two forward speeds that the size of the booster may not only be greatly reduced but also that a very simple type of gearing may be employed. For instance, planetary gears such as were used in the Model T Ford cars may be used and may be shifted automatically with increasing speed of the propeller shaft. The second approach involves a recognition of the fact that if the compressor receives air at substantial or rather high initial pressure its capacity for transmitting power is increased proportionally and its size may be accordingly decreased. In other words, with a given size compressor and pneumatic motor the work done varies proportionately with the exhaust pressure of the motor where that pressure is also the admission pressure of the compressor. It is another object to provide a torque booster sealed against loss of air and subject to a source of air pressure supply to compensate for leaks.

A further object is to provide a pneumatic torque booster free from such complications as variable stroke pistons and controlled entirely by valves, the valves being either automatic or controlled from a foot pedal which may be the accelerator pedal by which the supply of fuel to the prime mover engine is controlled. More specifically, it is an object to provide a torque booster in which no manual control is required except the unloading feature of the compressor inlet valves which consists in maintaining all such valves open when no torque is required from the gas engine, or which will maintain some of the inlet valves open when only a partial torque is required. This is done by the release, complete or partial, of the accelerator pedal of the gas engine. Otherwise the operation of the torque booster is automatic.

Other objects and advantages of the invention will become more fully apparent as reference is had to the accompanying drawings in which:

Figure 1 is a vertical section through the torque booster taken through and longitudinally of the drive shaft and driven shaft, showing the inlet valve in open position, Figure 2 diagrammatically illustrates the organization of a prime mover, the torque booster and shiftable gears arranged to drive a vehicle axle, Figure 3 is a detail section of a compressor cylinder showing the inlet valve closed, and Figure 4 is a diametric section taken along the line 4—4 of Figure 1.

More particularly, the booster comprises two series of cylinders 5 and 6 radially mounted on a spider 3 which is part of a propeller shaft 2, Fig. 1. The cylinders 5 are compressor cylinders and the cylinders 6 are pneumatic motor cylinders. A rigid housing 4 is illustrated as being attached to the prime mover 35, which may be an internal combustion engine, at one side and to the gear box 36 at the other and is centered about the driving shaft 1 which is shown as being the crank shaft of the gas engine and the driven shaft 2 which is shown as the input propeller shaft of the gear box 36. These two shafts enter the housing 4 through air seals 37 capable of resisting air pressure.

Pistons 7 in the cylinders 5 are connected to a crank 9 on the end of the crank shaft 1 of the engine 35 and pistons 8, in cylinders 6, are connected to an eccentric 10 which is fixedly secured, as by keying, on an internal extension 38 of housing 4 about the propeller shaft 2 which extension is therefore stationary. Housing 4, which encloses the booster organs just described is air tight and the air pressure in it is maintained by an air supply line 11 and an automatic valve 12 which admits air any time the air pressure in 4 falls below that in the supply line 11. Air pressure is maintained in the line 11 by any suitable source, as from a separate pump. Each cylinder 5 is provided with two automatic valves: an admission valve 13 which admits air at any time the pressure is below that in the casing 4, and one compressed air exhaust valve 14 which permits compressed air in the cylinder 5 to escape into a manifold 15 whenever the pressure in a cylinder 5 becomes greater than in the manifold 15. Each cylinder 6 is provided with two valves: an admission valve 16 which admits the compressed air from manifold 15 into cylinders 6 and measures that admission, as will be explained, and one semi-automatic valve 17 which admits air from the housing 4 into the cylinder 6 whenever the pressure in cylinder 6 falls to a predetermined point below that in the casing 4 and which is maintained open during the exhaust stroke.

Valves 13 are encircled by a ring 18 which is centered about shaft 1 and comprises, at each location corresponding to a valve stem, a cam 39 so designed that when ring 18 is shifted to the left the cams engage the stems and keep the valves open and, when shifted to the right, they disengage the stems and leave the valves free to perform their function in the compressor, subject only to the return spring 40. The ring 18 has a bearing portion 47 which is wider than and has sliding fit with the outer race of a ball bearing 49. The inner race of this bearing 49 is keyed or otherwise secured on the engine shaft 1. The bearing 49 is spaced from the main bearing 50 of the engine shaft 1 to allow sufficient room for sliding of the ring 18 under the action of the linkage 30.

The control or regulating means for the valves 16 comprises a cam 19 mounted on the extension 38 of the housing 4 acting on the stems of valves 16 by means of rods 20 and crankshafts 21.

Valves 17, which automatically permit air to enter cylinders 6 against the closing pressure of their springs 41 when the pressure in those cylinders becomes smaller than in the housing 4, are kept open during the exhaust stroke by a cam 22 mounted on the extension 38 of the housing 4. They act on the stems of valves 17 by means of rods 23 and crankshafts 24. The valves 17 will open to admit air to the cylinders 6 on the intake stroke of the pistons 8, for instance, when the valves 16 remain seated or admit an insufficient amount of air to fill the cylinders 6 at a pressure approximating that in the casing.

Cam 19 can be shifted in an axial direction on the extension 38, a distance such that in its extreme position to the left it operates valves 16 to produce full admission of air into cylinders 6 and in its extreme position to the right it ceases to operate valves 16 and the admission is nil. As previously stated, the pedal 34 is connected to the carburetor of the engine and is expected to be equipped with the usual spring which substantially closes the carburetor and returns the pedal to starting position when the foot of the operator is released therefrom. Neither the carburetor nor the return spring are illustrated in the drawings.

The position of cam 19 is regulated by a pressure responsive governor which may be a bellows 25 located in the manifold 15 and acting on the cam by means of a rod 26 and a lever 27 pivoted at 28 about a center based on the cylinder block of the cylinders 5 and 6. The lower end of this lever 27 engages a groove in the cam 19.

The position of the ring 18 is shifted by a ring 29 concentric with and slidable on the extension 38. The ring 18 is connected to the ring 29 by a rod 30 and a lever 31 pivoted at 32 about a center also based on the cylinder block, the end of the lever 31 engaging in a groove in the ring 29 provided therefor.

In turn, the position of the ring 29 is determined by a rod 33 elastically connected by an extension 41 from the pedal 34 and two springs 42 between the extension and the rod 33, with the accelerator pedal 34 used to accelerate the gas engine, in such manner that when the accelerator pedal 34 is pushed down, the ring 29 is shifted to the left, ring 18 to the right and valves 13 are permitted to function subject only to their springs 40 while when accelerator pedal 34 is released, ring 29 is shifted to the right, ring 18 to the left and valves 13 are kept open by the cams 39.

Operation

With the vehicle standing still, the gas engine 35 is started by means of a throttle (not shown) independent from the accelerator pedal 34. As accelerator pedal 34 is then in released position, as illustrated, the valves 13 are open, compressor pistons 7 under the action of crank 9 reciprocate in cylinders 5 and shaft 1 rotates idly without producing work.

To start to do work such as propelling a vehicle, the accelerator pedal 34 is depressed, the foot of the operator pressing against the left side of the pedal, as illustrated in Figures 1 and 2. This accelerates the engine 35, releases valves 13 so that they are subject only to the springs 40 and starts the function of the compressor. This occurs almost suddenly if the pedal is suddenly depressed a relatively large portion of its stroke, or it occurs progressively if the pedal is progressively depressed, as the cams of ring 18 are preferably arranged to release one valve 13 after another as it is moved to the right. As the air pressure in manifold 15 increases, cam 19 under the action of bellows 25 moves into a position which permits compressed air admission into cylinders 6 and soon the torque of the engine on the compressor, increased by the torque produced by air pressure in cylinders 6, becomes sufficient to start the propeller shaft 2. The propeller shaft gains speed but as long as the speed of the engine remains greater than that of propeller shaft 2, the motor will develop torque.

As the speed of the propeller shaft becomes still greater, the cylinders 6 take more air and if the speed of the gas engine is not increased in proportion the pressure in the manifold 15 decreases. The governor 25 then moves cam 19 into such a position that less air is fed to cylinders 6 at each admission until a condition is attained in which air admission no longer takes place.

The torque on the compressor, corresponding to that pressure in manifold 15, still exists and the cylinder block of the compressor and motor under the action of such torque, takes the speed of the gas engine. Under such condition the torque of the engine drives directly the cylinder block of the compressor and motor and the propeller shaft, and the compressor stops pumping air as its pistons cease moving in the cylinders. The compressor is revolving with the crankshaft 1 of the engine 35 and transmitting torque but it is not producing extra energy because its pistons 7 do not move with respect to cylinders 5.

If, at any time, the accelerator pedal is partially released, the torque of the gas engine is reduced and so is the torque transmitted through the booster and the speed of the propeller shaft slows down with that of the gas engine.

If the accelerator pedal is depressed to a further position so that the torque of the gas engine increases sufficiently, the speed of the gas engine increases faster than that of the propeller shaft, the compressor pumps air and increases the pressure in manifold 15, bellow 25 moves cam 19 and admission of compressed air into the motor again takes place boosting the gas engine torque until conditions of equilibrium, as heretofore existing, are reestablished again.

If the accelerator pedal is entirely released, ring 29 is pulled all the way to the right, ring 18 is pushed to the left and prevents valves 13 from closing and the entire booster idles as well as the gas engine.

Thus a transmission is provided in which the driving conditions of a vehicle are met without the use of a clutch and in which plenty of elasticity is present to take care of any sudden changes in gas engine or vehicle speed without producing detrimental shocks.

Functioning of the booster is dependent on the gas engine revolving at a speed materially greater than the speed of the propeller shaft. The speed of the compressor pistons 7 is equal to the difference between these two speeds. The work which the compressor produces is proportional to that difference and that work is all utilized by the motor and transmitted to the propeller shaft. In other words the product speed-load on the engine shaft must equal the speed-load on the propeller shaft to effect equilibrium. The system keeps in equilibrium and the product load-speed on the driven shaft must equal that of the driving shaft, therefore the relative speeds of the driving and driven shafts determines the load on each. It is therefore inconsequential whether we speak of speed or load since each of these factors must vary with the other and cannot vary independently.

Hence, the help of the booster vanishes when the speed of the driven or propeller shaft reaches the speed of the crankshaft, according to the regulation provided with bellows 25 and cam 19.

Figure 2 illustrates the booster at it is assembled in a vehicle, for instance. In this figure the booster, indicated generally by the numeral 43, is positioned between the engine 35 and that part of the power transmission which includes shiftable gears and which is indicated at 36. The propeller shaft 2 which is also the primary driven shaft extends from the booster into the housing 36 while the propeller shaft 45 or final driven shaft extends rearwardly of the housing 36 for connection to an axle 46.

The gears of the unit 36 may be any conventional or special automotive type of transmission either manually or automatically shiftable. I recommend and prefer a two speed transmission of simple type similar in principle to the planetary transmission used on Model T. Ford automobiles, where my invention is applied to buses. That type transmission may be permitted to shift automatically from low to high speed under control of a speed responsive device. The action with such a transmission will now be described.

For instance, the proportions between the elements of the compressor and of the air engine may be such that maximum torque of the booster is developed up to the time the speed of the propeller shaft reaches one half of the speed of the gas engine. If then, after the start of the vehicle the pedal is depressed to a point at which the torque of the gas engine starts to fade rapidly at a speed of 1800 R. P. M., the torque of the booster will remain maximum until the speed of the propeller shaft reaches a speed of 900 R. P. M. Then, the torque of the booster although still existent, will decrease slowly while the speed of the proller will, in time, reach a speed of 1200 R. P. M., with the gas engine still revolving at 1800 R. P. M. The speed of the vehicle is then 10 M. P. H. for example. If the speed responsive mechanism of the transmission is so regulated that it operates at that speed, the transmission will then be shifted automatically from second to direct, the speed of the propeller shaft will change from 1200 to 600, the gas engine speed will be reduced from 1800 to 1200 and the torque of the booster will become maximum again. Such a condition will continue until the speed of the propeller shaft becomes 900 R. P. M. and that of the motor reaches 1800 again, at which time, the speed of the vehicle, with the transmission in direct may be 15 M. P. H. From then on, if the accelerator pedal is not moved, the torque of the booster will decrease again until it becomes nil when the speed of the vehicle is then 30 M. P. H. and is maintained by the direct torque of the gas engine.

A new set of relations is obtained for each position of the pedal, but each set depends on the torque and speed of the gas engine and follows a cycle similar to the one described.

The booster has been described as of pneumatic type because maximum flexibility of control is desired. It is essential to my invention that the booster respond to its own valves rather than directly to exteriorly driven controls. The rod 33 conditions the booster for operation but is not responsible for regulation of the operation in itself in producing torque. The same effect, to a less desirable extent, can be had if hydraulic fluid is substituted for air provided some cushion such as an air bell of proper size is added to the manifold 15. In that case the air compressor might be described by the broader term "fluid impeller."

When the word "air" is used in the claims it will be understood that the general term "gaseous fluid" is equally applicable.

What I claim is:

1. The combination of a prime mover having a rotating drive shaft, a driven shaft, a transmission connecting said shafts comprising an air compressor adapted to transmit the torque of said drive shaft directly to said driven shaft, said compressor having pistons which reciprocate at a speed equal to the differential speeds of said shafts and which are adapted to pump air in an amount proportionate to their speed of reciprocation, a motor driven by the air pressure produced by said compressor to produce a torque, and means transmitting the torque of said motor to said driven shaft for addition to the torque impressed directly on said driven shaft by said compressor, said compressor having inlet valves and said motor having outlet valves, all of said valves opening into a common chamber containing air maintained at a pressure substantially above atmospheric.

2. The combination of a prime mover having a rotating drive shaft, a driven shaft, a transmission connecting said shafts comprising an air compressor adapted to transmit the torque of said drive shaft directly to said driven shaft, said compressor having pistons which reciprocate at a speed equal to the differential speeds of said shafts and which are adapted to pump air in an amount proportionate to their speed of reciprocation, a motor adapted to be driven by the compressed air from said compressor, a governor responsive to the pressure of the air from said compressor for regulating the operation of said motor, said motor being adapted to produce a torque and to impress its torque on said driven shaft in a manner additive to that impressed directly on said driven shaft by said compressor, said compressor having inlet valves and said motor having outlet valves, all of said valves opening into a common chamber containing air maintained at a pressure substantially above atmospheric.

3. The combination of a prime mover having a rotating drive shaft, a driven shaft, a transmission connecting said shafts comprising an air compressor having reciprocating pistons adapted to transmit the torque of said drive shaft directly to said driven shaft, the pistons of said compressor reciprocating at a speed equal to the differential speeds of said shafts and adapted to pump air in an amount proportionate to their speed of reciprocation, a motor driven by the air pressure produced by said compressor to produce a torque, and means transmitting the torque of said motor to said driven shaft for addition to the torque impressed directly on said driven shaft by said compressor, said compressor and said motor both being of the reciprocating type and each having reciprocations of fixed length, said compressor and said motor each having inlet and outlet valves, manual means for regulating the opening of the inlet valves of said compressor constituting the sole manual control over said transmission, a cam having a pushrod adapted to maintain the outlet valves of said motor open during the exhaust stroke of their respective pistons, said outlet valve being spring pressed to closed position and adapted to open automatically at any time when the pressure in their respective cylinders falls below the pressure against the outside surfaces of said valves.

4. The combination of a prime mover having a rotating drive shaft, a driven shaft, a housing, a transmission in said housing connecting said shafts comprising a rotary, radial air compressor having its cylinders fixedly mounted on said driven shaft, each of said cylinders having a reciprocatory piston therein, said drive shaft having a crank to which the connecting rods for the pistons of said compressor are rotatably attached, a pneumatic rotary, radial motor having cylinders fixedly mounted on said driven shaft, each of said cylinders having a reciprocatory piston therein, a stationary eccentric fixed to said housing encircling said driven shaft and to which the connecting rods for the pistons of said motor are rotatably attached, said compressor and said motor each having inlet and outlet valves, a manifold into which said compressor delivers air from its outlet valves and which supplies air to said motor past its inlet valves, manually controllable means for the inlet valves of said compressor for regulating the quantity of air admitted to said compressor, automatic means responsive to the pressure in said manifold for regulating the opening of the inlet valves of said motor, and means opening the outlet valves of said motor during its exhaust stroke, said outlet valves of the motor being spring pressed toward their seats and being adapted to open automatically at any time when the pressure in the cylinders of said motor falls below the pressure outwardly of said outlet valves, the inlet valves of said compressor and the outlet valves of said motor opening into a common manifold maintained at a pressure substantially above atmospheric.

EMIL H. PIRON.

REFERENCES CITED

The following references are of record in the file of this patent:

UNITED STATES PATENTS

| Number | Name | Date |
| --- | --- | --- |
| 1,349,161 | Kress | Aug. 10, 1920 |
| 1,370,290 | Crofton | Mar. 1, 1921 |
| 1,388,464 | Hautier | Aug. 23, 1921 |
| 1,545,678 | Miller | July 14, 1925 |
| 1,707,376 | Vogel | Apr. 2, 1929 |
| 1,840,876 | Rayburn | Jan. 12, 1932 |
| 1,981,805 | Kačer et al. | Nov. 20, 1934 |
| 2,074,618 | Roeder | Mar. 23, 1937 |
| 2,141,166 | Bischof | Dec. 27, 1938 |

FOREIGN PATENTS

| Number | Country | Date |
| --- | --- | --- |
| 241,975 | Great Britain | Oct. 21, 1925 |
| 356,511 | France | Oct. 7, 1905 |
| 476,731 | France | June 3, 1915 |